Patented Jan. 25, 1949

2,459,780

UNITED STATES PATENT OFFICE 2,459,780

ANELLATED POLYCARBOCYCLIC PERFLUOROCOMPOUNDS

Earl T. McBee, La Fayette, Ind., and Lavon D. Bechtol, Baltimore, Md., assignors to Purdue Research Foundation, West Lafayette, Ind., a corporation of Indiana No Drawing. Application September 24, 1945, Serial No. 618,394

10 Claims. (Cl. 260—648)

This invention relates to a novel group of organic compounds constituted by the saturated perfluoropolycarbocyclic anellated compounds wherein the number of rings is at least three and the number of shared carbon atoms is at least three.

We have prepared and identified several representative members of this group of compounds and have determined certain of their physical constants whereby they may be identified. The compounds, in general, are water-white liquids or solids which vaporize at temperatures somewhat above the boiling point of water and possess remarkable stability at elevated temperatures, even in the presence of metals. Their non-flammability and their stability, particularly to heat and oxidation, make them very attractive for technological purposes, particularly as high temperature heat transfer media. Certain of these compounds exhibit lubricating properties.

The compounds may be prepared by a process which comprises treatment of the desired hydrocarbon with a metal perfluoride at elevated temperatures whereby all of the hydrogen in the compound is replaced with fluorine and any double bonds are saturated with fluorine. The process may be carried out, for example, stepwise in the vapor phase by passage of the hydrocarbon over a metal perfluoride maintained at progressively increasing temperatures in a plurality of reactors connected in series. The invention herein is not limited by the process of manufacture or apparatus employed, but is concerned solely with the new group of compounds herein described and claimed.

We will now describe generally a vapor phase reactor system, consisting of one to five units connected in series and constructed of welded mild steel or copper, in which a number of representative compounds included within the scope of our invention were prepared. Each of the units was surrounded by a separate electric heater to facilitate operation at any desired temperature independent of the other units. The first unit contained four chambers, each one inch in height, eight inches in width, and forty-eight inches in length, arranged for parallel flow of reactants therethrough. In any instance where more than one unit was employed, the second unit, receiving the reactants from the first unit, contained two chambers arranged in series. The following units were similar to the second unit, when employed. Each of the chambers may be filled with approximately twenty (20) grammoles of silver difluoride ($AgF_2$). A vaporizer was provided in which the hydrocarbon could be heated at least to its boiling point. A source of nitrogen under pressure was so located as to allow nitrogen to be passed into the molten hydrocarbon, the gases being led into the first unit of the reaction system. A collection train was constructed to receive the effluent gases from the last unit of the reaction system. This comprised three copper traps; the first exposed to the air of the room, the second immersed in ice water, and the third set in dry ice. The product collected was accumulated, washed with water and dilute aqueous potassium hydroxide, dried over Drierite, and fractionally distilled.

The following examples illustrate the preparation of certain members of this new group of compounds, but are in no way to be construed as limiting the invention thereto:

Example 1

The preparation of perfluoroacenaphthane was accomplished in the previously described apparatus. The first reactor, of welded iron, contained 40 moles of silver difluoride ($AgF_2$); the second and third reactors, of copper, each contained 12 moles of silver difluoride.

Three-fourths mole (116 grams) of acenaphthene was placed in an iron vaporizer, melted, and vaporized by passing nitrogen gas into the liquid. The temperature of the hydrocarbon in the vaporizer was maintained between 200 and 250 degrees centigrade for the first three hours, then was gradually raised to 300 degrees centigrade, where it was maintained for two hours. Throughout this period the temperature of the reaction zone was maintained at approximately 200 degrees centigrade in the first unit, at 250 degrees centigrade in the second unit, and at about 315 degrees centigrade in the third unit. After all the hydrocarbon had been vaporized, the temperature of the first two units was raised to 300 degrees centigrade and nitrogen gas passed through the system for several hours to insure substantially complete removal of the product. The organic product was accumulated in the collection train. The product was washed with water and dried over Drierite. After the silver difluoride had been regenerated in the reactor system, the organic product was again introduced to the system over a period of three hours from a dropping funnel. During this period of further treatment the reactors were maintained at a temperature between 300 and 315 degrees centigrade.

Washing with water and dilute aqueous potassium hydroxide, drying with Drierite, and rectification of the crude product yielded 138 grams of perfluoroacenaphthane, ($C_{12}F_{20}$), which boils at 172.5 to 173.5 degrees centigrade at 750 millimeters of mercury pressure absolute. Other physical constants of perfluoroacenaphthane were found to be: a specific gravity of 1.988 and an index of refraction of 1.329, both at 20 degrees centrigrade.

*Example 2*

The preparation of perfluoro-4,7-methanoindane was accomplished in the reaction system above-described with the following modification: A single flat reactor of one section only and containing all of the reagent ($AgF_2$) was utilized. Twenty moles of the silver difluoride was necessary in the reaction zone for this perfluorination. One hundred grams (.76 mole) of dicyclopentadiene was vaporized as previously described and passed through the reaction zone maintained at a temperature of 200 degrees centigrade. After three hours, the hydrocarbon having been added completely, the temperature of the reactor was raised to 350 degrees centigrade and the reactor was purged with nitrogen for twenty minutes. The organic material from the initial run was collected in cooled copper traps and again introduced into the reaction zone. The operation was repeated twice. In each case the reactor contained 20 moles of freshly formed silver difluoride. The temperature of the reaction zone was maintained at 250 degrees centigrade during the first reintroduction operation, 300 degrees centigrade for the second reintroduction, and 400 degrees centigrade for the third reintroduction. Washing and drying were accomplished as described in Example 1 and upon rectification, the perfluoro-4,7-methanoindane was found to have boiling point of 133.5 degrees centigrade at 746 millimeters of mercury pressure absolute and a specific gravity of 1.895 at 30 degrees centigrade. The index of refraction at 20 degrees centigrade is 1.313.

*Example 3*

The preparation of perfluorofluorane was accomplished in the generally described apparatus, using in this instance four reactor units. One-half mole (83 grams) of fluorene was passed into the series of reactors after having been vaporized with the aid of nitrogen in an iron vaporizer. The vaporizer was maintained at a temperature of between 250 and 260 degrees centigrade for a period of four hours and then gradually raised to 300 degrees centigrade. Throughout the period of vaporization nitrogen gas was slowly bubbled into the melted hydrocarbon. The units of the reaction zone were maintained at the following temperatures during the addition of the hydrocarbon: the first unit at about 160 degrees centigrade, the second unit at approximately 230 degrees centigrade, the third unit at 290 degrees centigrade, and the fourth unit at 320 degrees centigrade. After all the hydrocarbon had been introduced, the temperatures of the first three units were raised to 300 degrees centigrade and nitrogen gas was allowed to continue to pass through the reactors for substantially complete product removal. The product was collected in two copper traps, the first at room temperature and the second at ice temperature. The product was washed with water and dried with Drierite. The $AgF_2$ having been regenerated in the reactors, the organic product was reintroduced over a period of two hours, during which time the reactors were maintained at a temperature between 300 and 320 degrees centigrade. The organic product obtained was washed with water, dried with Drierite, and fractionally distilled. This rectification yielded 30 grams of perfluorofluorane, boiling at 190 degrees centigrade at atmospheric pressure. This compound has a specific gravity of 1.982 and an index of refraction of 1.326, both at 20 degrees centigrade.

*Example 4*

The preparation of perfluorophenanthrane was accomplished in the following manner: One-half mole (89 grams) of phenanthrene was introduced into the iron vaporizer used in Example 3 and vaporized with nitrogen. The temperature of the vaporizer was maintained between 200 and 250 degrees for five hours and then raised to 350 degrees centigrade for five hours. The reaction zone temperature in all units was maintained at 200 degrees centigrade during the addition of the hydrocarbon and was raised gradually to 325 degrees centigrade upon complete vaporization. Nitrogen was allowed to continue to pass through the system for several hours to insure removal of the product. The product was collected in cooled copper traps, washed with water and dilute aqueous potassium hydroxide solution and dried with Drierite. Rectification yielded 41 grams of perfluorophenanthrane, boiling at 205 to 206 degrees centigrade at atmospheric pressure and having a specific gravity of 2.020 and a refractive index of 1.331, both at 20 degrees centigrade.

*Example 5*

The preparation of perfluorofluoranthane was carried out in the apparatus described in Example 4 as follows: One-half mole (101 grams) of fluoranthene was vaporized in the iron vaporizer and the vapors carried into the reactor system by a stream of nitrogen gas. The vaporizer temperature was maintained between 300 and 350 degrees centigrade for five hours. At the end of this period the fluoranthene had all been vaporized. The temperature of the reactor system was maintained at 200 degrees centigrade until the hydrocarbon had been vaporized completely and then raised gradually to 324 degrees centigrade. Nitrogen gas was passed through the system for an additional period of several hours to insure product removal. The organic product was collected, washed, and dried as in Example 4 and fractionally distilled. Perfluorofluoranthane boils at 235 to 239 degrees centigrade at atmospheric pressure and has a specific gravity of 2.060 and an index of refraction of 1.346, both at 20 degrees centigrade.

*Example 6*

One-fourth mole (44.5 grams) of anthracene was placed in a cold flat iron reactor unit containing 40 moles of $AgF_2$, and heated slowly to 320 degrees centigrade over a period of five hours. Nitrogen was then passed into the reactor for several hours to substantially remove the product, which was collected in a copper trap. The organic product was melted and poured from the trap. Upon treatment as above and fractional distillation, the crude product yielded 46 grams of perfluoroanthracane, boiling at 211 to 213 degrees centigrade at atmospheric pressure.

Other methods may be employed in the preparation of the compounds herein described and :laimed. For example, a method which is particularly useful in the preparation of perfluorocompounds of the type herein concerned which are substituted with one or more alkyl radicals, and which has utility only in such cases, comprises at least the partial chlorination of the side chain of an appropriate hydrocarbon and at least the partial replacement of chlorine by fluorine through the use of anhydrous hydrogen fluoride, antinony trifluoride, or other similar fluorinating agents. The hydrogen and any chlorine remaining in the partially fluorinated compound may then be replaced with fluorine through the use of a metal perfluoride such as silver perfluoride ($AgF_2$), cobalt trifluoride ($CoF_3$), lead tetrafluoride ($PbF_4$), et cetera.

Among other compounds, included within the scope of our invention, which may be prepared according to processes as herein disclosed are perfluoro-1-methylanthracane, perfluoro-1-isopropylanthracane, perfluoro-1-n-octylanthracane, perfluorotricyclo(4.1.1.0$^{2,4}$)octane, perfluoro-1,4-methanonaphthalene, perfluorocyclohept(cd)-indane, perfluoro-1-4- and -2,5 - methanopentalanes, perfluorocyclopent(a, f, or e)indanes (Ring Index numbers 1458, 1459 and 1460), perfluorobenz(e or f)indanes (Ring Index numbers 1773, 1776, 1777 and 1778), perfluorodibenzo-(a, e)cycloheptatriane, perfluorodibenzo(a, c)-cycloheptatriane, perfluorocyclohepta(de)naphthalane and mono- or polyalkyl derivatives thereof. Our invention is particularly concerned with the saturated perfluoropolycarbocyclic anellated compounds wherein the number of fusions or anellations containing at least two adjacent shared carbon atoms is two. An additional preferred embodiment of our invention is the class of saturated perfluoropolycarbocyclic anellated compounds wherein at least one carbon atom is shared between three rings.

We claim:

1. A compound from the group consisting of saturated polycarbocyclic anellated and saturated lower-alkyl substituted polycarbocyclic anellated fluorocarbons wherein the number of rings is at least three and the number of shared carbon atoms is at least three, the total number of carbon atoms being from 8 to 22, inclusive.

2. A saturated polycarbocyclic anellated fluorocarbon wherein the number of rings is at least three and the number of shared carbon atoms is at least three, the total number of carbon atoms being from 10 to 16, inclusive.

3. A saturated polycarbocyclic anellated fluorocarbon wherein the number of adjacent shared carbon atoms is at least two and the number of anellated rings is at least three, the total number of carbon atoms being from 10 to 16, inclusive.

4. A saturated polycarbocyclic anellated fluorocarbon wherein the number of anellations containing at least two adjacent shared carbon atoms is at least two, the total number of carbon atoms being from 10 to 16, inclusive.

5. A saturated tricarbocyclic anellated fluorocarbon wherein the number of anellations containing at least two adjacent shared carbon atoms is two, the total number of carbon atoms being from 10 to 14, inclusive.

6. A saturated polycarbocyclic anellated fluorocarbon wherein at least one carbon atom is shared between three rings, the total number of carbon atoms being from 12 to 16, inclusive.

7. A saturated polycarbocyclic anellated fluorocarbon wherein the number of adjacent shared carbon atoms is at least two and wherein at least one carbon atom is shared between three rings, the total number of carbon atoms being from 12 to 16, inclusive.

8. Perfluoroacenaphthane.
9. Perfluorophenanthrane.
10. Perfluoroanthracane.

EARL T. McBEE.
LAVON D. BECHTOL.

REFERENCES CITED

The following references are of record in the file of this patent:

UNITED STATES PATENTS

| Number | Name | Date |
|---|---|---|
| 2,013,030 | Calcott et al. | Sept. 3, 1935 |

FOREIGN PATENTS

| Number | Country | Date |
|---|---|---|
| 429,591 | Great Britian | May 28, 1935 |

OTHER REFERENCES

Zincke et al., "Annalen," vol. 367, page 12 (1909).

"Chemical Abstracts," vol. 3, page 2934 (1909).

Simons et al., "J. A. C. S.," vol. 61, pages 2962–6 (1939).

Rukuhara et al., "J. A. C. S.," vol. 63, pages 2792–5 (1941).

Ruff et al., "Zeit. anorg. allgem. Chem.," vol. 192, pages 249–256 (1930).